United States Patent [19]

Nickell et al.

[11] 4,162,479

[45] Jul. 24, 1979

[54] AUTOMOBILE BURGLAR ALARM WITH BATTERY VOLTAGE SENSING MEANS

[75] Inventors: Larry C. Nickell, Lewisburg; John L. McCormack, Fairlea, both of W. Va.

[73] Assignee: Appalachian Electronic Instruments, Inc., Ronceverte, W. Va.

[21] Appl. No.: 860,157

[22] Filed: Dec. 13, 1977

[51] Int. Cl.² .................................................. B60R 25/10
[52] U.S. Cl. ............................. 340/63; 340/528; 340/660
[58] Field of Search ............... 340/63, 64, 511, 565, 340/566, 659, 660, 661; 307/10 AT; 180/114

[56] References Cited

U.S. PATENT DOCUMENTS

| 3,533,064 | 10/1970 | Perelman | 340/63 |
| 3,713,128 | 1/1973 | Wong et al. | 340/566 |
| 4,067,411 | 1/1978 | Conley et al. | 340/63 |

*Primary Examiner*—Alvin H. Waring
*Attorney, Agent, or Firm*—Mason, Fenwick & Lawrence

[57] ABSTRACT

An automobile burglar alarm including a battery voltage level sensor to be connected to the positive terminal of the automobile battery for providing an output signal level indicating the battery voltage level and responsive to reduction in the automobile battery voltage when an automobile dome light or trunk light supplied by the battery is turned on to provide a changed output signal level which persists for a predetermined time period, indicative of the reduced battery voltage level, a normally non-conducting transistor connected in circuit with the automobile headlight and horn relays to a supply voltage source to energize the relays when the transistor conducts, a timer circuit connected to the transistor to supply a timed output signal for causing the transistor to conduct for a predetermined short conduction interval, and an operational amplifier coupled to the sensor and the timer circuit for supplying an amplified signal adequate to cause the timer circuit to produce the timed output signal.

13 Claims, 5 Drawing Figures

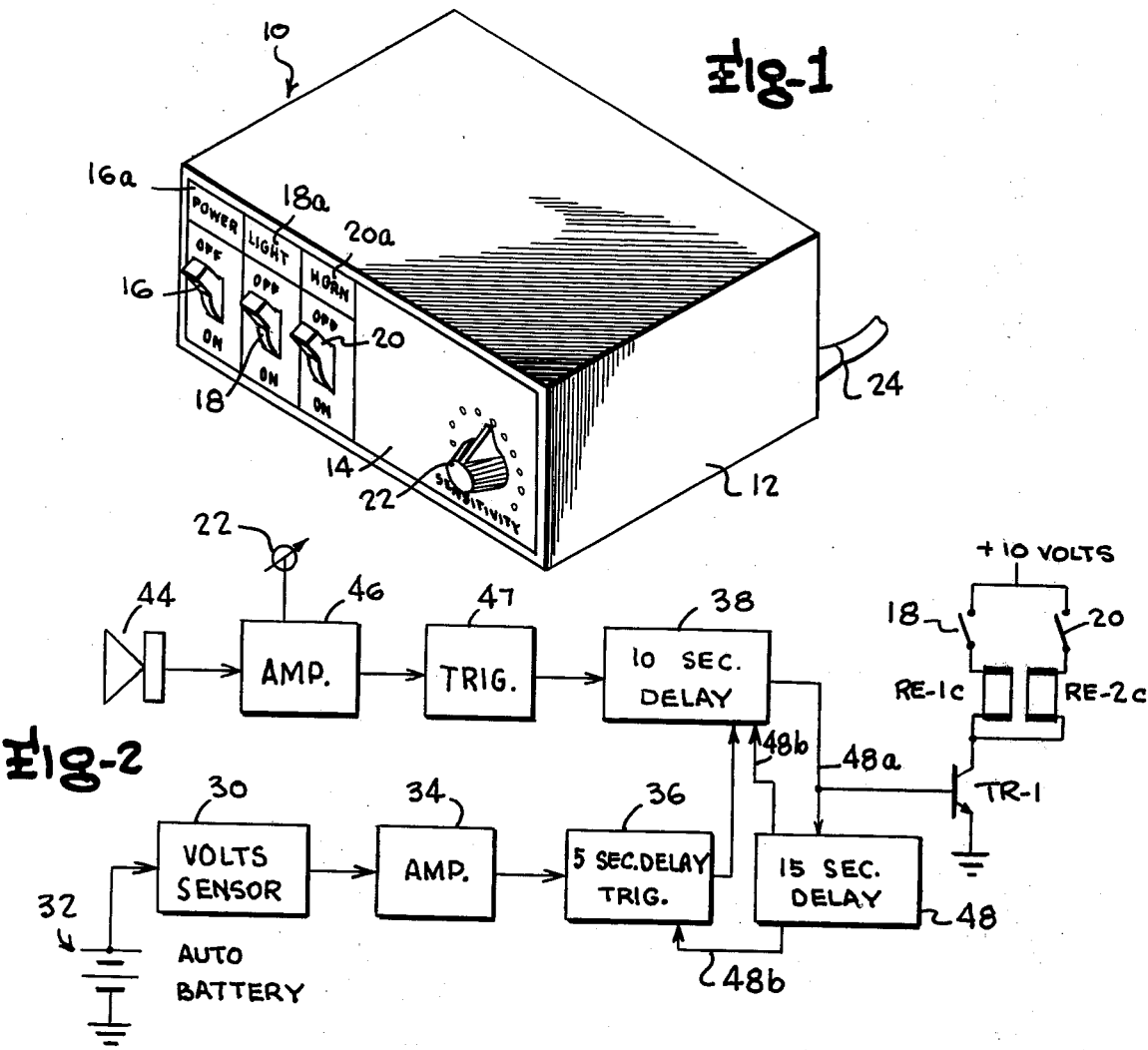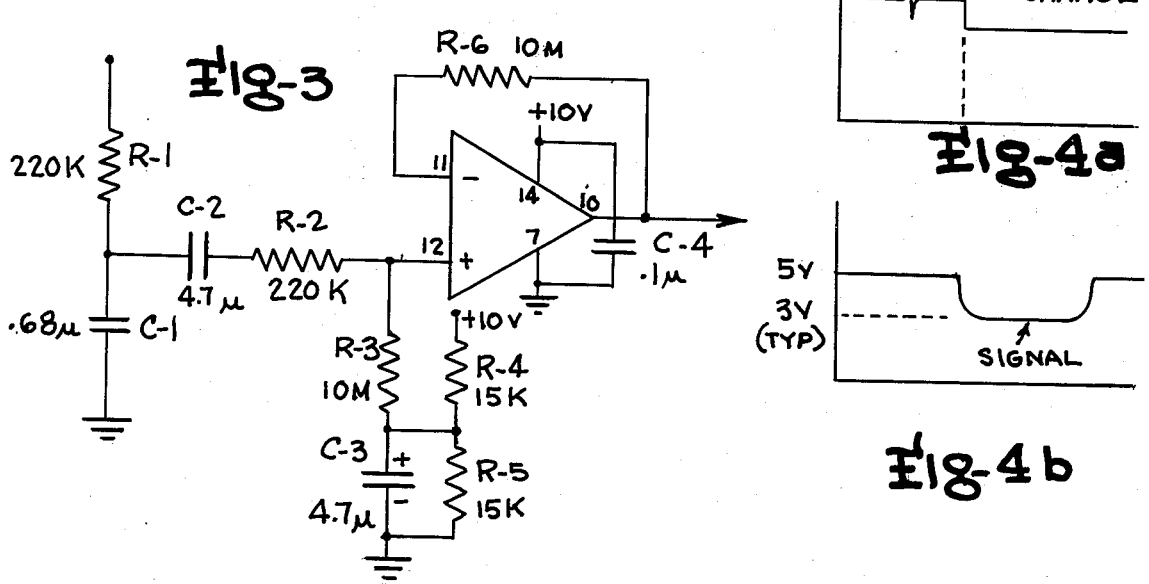

AUTOMOBILE BURGLAR ALARM WITH BATTERY VOLTAGE SENSING MEANS

BACKGROUND AND OBJECTS OF THE INVENTION

The present invention relates in general to automobile burglar alarm devices, and more particularly to an automobile burglary alarm specially designed for protecting automobiles in public parking lots, having connections to the battery and the headlight and horn circuits of the automobile for monitoring battery voltage and thereby sensing when the domelight or the trunklight is turned on by burglar entry for energizing the automobile headlights and horn.

Heretofore, various automobile burglar alarm devices have been provided to respond to opening of automobile doors or breakage of glass or other illegal entry into an automobile when parked on public streets or in public parking lots to produce some kind of attention demanding indication of burglar entry into the automobile. Frequently these devices may be provided with switches or electrical circuit elements of various types associated with the doors, trunk, and/or windows or other portions of the automobile to cause a circuit to be activated when the switch or other access area monitoring device senses unauthorized entry into the automobile. Several such devices have employed sound detector transducers to sense certain sounds associated with breakin of the vehicle to activate an audible alarm or some other indicator of illegal entry into the automobile, and some of such devices have relied upon photoelectric sensors to respond to the light generated when the domelight turns on or when some special event associated with burglar entry occurs. It is desired to devise an automobile burglar alarm which will be relatively inexpensive to manufacture and highly reliable in operation, which avoids the necessity of using expensive photoelectric or sound transducer devices and circuitry and which can make use of the existing headlight and horn circuits of the automobile to produce alarm signals indicating unauthorized burglar entry into the automobile.

An object of the present invention, therefore, is the provision of a novel burglar alarm device for automobiles having undervoltage sensing circuitry for monitoring the battery voltage of the automobile battery to detect reduced battery voltage conditions, when placed in a burglar alarm mode, to sense when the domelight or trunklight of the automobile is turned on by burglar entry, and to activate the automobile headlight and horn circuits to indicate burglar entry.

Another object of the present invention is the provision of a novel burglar alarm device for automobiles of the type described in the immediately preceding paragraph, provided with delay circuitry to delay activation of the automobile headlight and horn circuits when battery voltage reduction occurs, for a short period enabling the burglar alarm device to be switched off by the owner, when the owner enters the automobile to provide for owner cutoff opportunity.

Other objects, advantages and capabilities of the present invention will become apparent from the following detailed description, taken in conjunction with the accompanying drawing illustrating a preferred embodiment of the invention.

BRIEF DESCRIPTION OF THE FIGURES

FIG. 1 is a front perspective view of an automobile burglar alarm device embodying the present invention, illustrating the switch and sensitivity controls provided on the device;

FIG. 2 is a block diagram indicating the electrical circuit of the device;

FIG. 3 is a schematic diagram of the electrical circuitry; and

FIGS. 4a and 4b are input and output voltage wave forms for the automobile burglar alarm of the present invention.

DETAILED DESCRIPTION OF A PREFERRED EMBODIMENT

Referring to the drawings, wherein like reference characters indicate corresponding parts throughout the several figures, the automobile burglar alarm device of the present invention is indicated in general by the reference character 10, and in the illustrated embodiment is housed in a generally rectangular case or housing 12 of a size convenient to be mounted under the dashboard of an automobile at a location wherein the front of the burglar alarm device is accessible for manipulation of controls thereon by the automobile operator. The front panel of the case or housing 12 is indicated generally by the reference character 14, in the illustrated embodiment, and includes three manual switches 16, 18 and 20 having on and off positions and respectively labelled, as indicated at 16a, 18a and 20a, to indicate on-off control of the main power for the burglar alarm device, and on-off control of the automobile light circuit and the automobile horn circuit. There is additionally provided a sensitivity control in the form of a rotatable pointer knob 22 to the righthand side of the front panel 14, as viewed in FIG. 1, mounted on a potentiometer shaft and rotatable to different angular positions for adjusting the sensitivity of the alarm device. The burglar alarm device also includes an electrical cable plug 24 which may be plugged into a socket located, for example, on the rear wall of the case or housing 12 providing a conductor cable having wires leading to relays controlling the automobile horn circuit and the automobile light circuit by relay contacts interposed in those circuits to energize the automobile horn and the headlights when the burglar alarm device is activated.

Referring now to FIG. 2, illustrating in block diagram form the circuitry making up the burglar alarm device, the burglar alarm includes a voltage sensor stage, indicated by the reference character 30, connected to the positive terminal of the automobile battery, here indicated at 32. The output of the voltage sensor 30 is connected to an amplifier 34, whose output is connected to the input of a 5-second trigger delay stage 36. The 5-second trigger delay stage 36 is preferably a timer integrated circuit, for example an NE-555 timer integrated circuit made by Signetics. The output from the 5-second trigger delay circuit 36 is applied to a 10-second timer stage 38, which may be formed of another NE-555 timer integrated circuit having a trigger incorporated therein, and the output from the 10-second timer circuit 38 is applied to the base of a transistor TR-1, having its emitter connected to ground and its collector connected in parallel to the relay coil RE-1c of the automobile headlight circuit control relay RE-1 and to the relay coil RE-2c of the automobile horn circuit control relay RE-2. The relay coil RE-1c and RE-2c are connected through the manual switches 18 and 20 to a 10-volt voltage supply, for example, derived from the voltage supply circuit of the automobile, so as to provide for manual selection of the headlight and/or horn circuits to be activated by the burglar alarm system. It will be appreciated that relay contacts, not shown, are controlled by the electro-magnetic field established by the coils RE-1c and RE-2c when they are energized to close the supply circuit to the automobile headlights and to the automobile horn in bypass relation to the manual horn control switch in the automobile steering post and manual headlight switch on the automobile dashboard to activate the headlights and energize the horn.

In the embodiment shown in FIG. 2, there is also provided a sound detector chanel to sense certain sounds associated with automotive breakin, for example by providing a sound detector transducer, such as microphone 44, coupled to an amplifier stage 46 and designed to respond to sounds above a certain intensity level having frequencies extending from about 5,000 cycles per second to 15,000 or 20,000 cycles per second. The output of the sound detector channel amplifier 46 is applied to the input of the trigger portion 47 of the integrated circuit timer and comparative trigger employed for the 10-second timer 38 with the output of the trigger circuit portion 47 also applied to the 10-second timer 38. Also in the embodiment illustrated in FIG. 2, a 15-second delay stage 48 is associated with the 10-second timer 38 and the 5-second timer 36, the 15delay stage 48 having an input 48a from the output of the 10-second timer 38 and having outputs 48b applied as an input to the reset or inhibit terminals of the 10-second timer 38 and 5-second timer 36. This provides a 15-second "power on delay" after initial manual shifting of the power switch 16 to the on position, to insure that the circuits are in proper operating condition, and to avoid false reactivation of the burglar alarm for 15-seconds after the 10-second timer times out and ceases conduction through transistor TR-1, so that signals from the sound transducer microphone 44 produced from sounds associated with the relays RE-1 and RE-2 clicking of after they have been energized for the 10-second conduction period of TR-1 produced by the 10-second timer 38 going high will not reactivate the alarm.

The circuitry and operation of the automobile burglar alarm will be more clearly understood with reference to FIG. 3, illustrating in schematic diagram form portions of the electronic circuit. Referring to FIG. 3, the voltage sensor portion 30 of the burglar alarm includes a resistor R-1 and capacitor C-1, having for example the values indicated in FIG. 3, connected in series to form a voltage sensing circuit between the positive terminal of the automobile battery 32 to be monitored and electrical ground. The junction between the resistor R-1 and capacitor C-1 is connected through capacitor C-2 and resistor R-2 to the positive input pin 12 of the operational amplifier A-1, which may be one-fourth of a Quad Operational Amplifier package such as a National Semi-Conductor LM-3900 or 741, the choice of this Operational Amplifier package providing a convenient and economicl choice for the circuitry as the remaining three-quarters can be used in the sound detector circuit. A resistive feedback circuit is provided between the output pin 10 and the negative input pin 11 of the Operational Amplifier A-1 through the resistor R-6, the resistors R-2 and R-6 determining the gain of the amplifier. In one satisfactory example, the gain is such as to produce an output signal from the Amplifier of more than ½ volt for signal level changes of less than 200 millivolts at the junction of R-1 and C-1. Resistors R-3, R-4 and R-5 are connected between the input pin 12 and electrical ground to give midrange biasing to the Operational Amplifier, the resistor R-5 being paralleled by capacitor C-3 and the upper end of resistor R-4 being connected to plus 10-volts. Antitransient capacitor C-4 is connected between pins 14 and 7 and pin 14 is connected to plus 10-volts and pin 7 connected to electrical ground.

It will be appreciated that with this circuit, the capacitor C-1 will charge up to the battery voltage of the automobile battery 32 over a long period of time. This is illustrated by the wave form in FIG. 4a showing typical voltage fluctuations at the upper end of capacitor C-1 for a 12 volt or 24 volt automobile battery installation. After the capacitor C-1 has become charged to the full battery voltage of the automobile battery, if the battery voltage drops as a result of turning on of either the domelight, responsive to opening of any of the automobile doors having domelight switches, or responsive to turning on of the trucklight upon opening of the automobile trunk (the voltage drop at the top of C-1 being typically less than about 200 millivolts, for example 50 millivolts) and stays at the lower level determined by the time constant of the resistance-capacitor circuit formed by R-1 and C-1, the voltage at the output pin 10 of the Operational Amplifier A-1 drops from typically about five volts to about three volts and this signal is applied to the input pin of the 5-second trigger 36. The 5-second trigger delay circuit 36, after its 5-second delay period times out, applies a pulse to the input of the 10-second timer circuit 38 to trigger the latter after the five second delay. The output of the 10-second delay timer 38 goes high for the 10-second time period following receipt of the 5-second delay trigger output, causing the transistor TR-1 to conduct and producing current flow through either or both of the relay coils RE-1c and RE-2c, when their manual switches 18, 20 are in on position, to energize the light and horn circuits and cause the automobile horn to sound and the headlights to turn on for the 10-second period. The output of the 10-second timer 38 then goes to its low output state, triggering the 15-second delay stage 48 to time out a 15-second period during which its output on leads 48b inhibits the 5-second delay trigger 36 and 10-second delay timer 38 from acting to reactivate the alarm for the 15-second period.

What is claimed is:

1. An automobile burglar alarm having automobile battery voltage sensing means to be mounted in an automobile at a location accessible to the operator, comprising battery voltage level sensor means to be connected to the positive terminal of the automobile battery for providing an output signal level indicating the battery voltage level and responsive to reduction in the automobile battery voltage when an automobile dome light or trunk light supplied by the battery is turned on to provide a changed output signal level indicative of the reduced battery voltage level, a headlight control relay and a horn control relay for energizing the automobile headlights and horn of the associated automobile, a normally non-conducting transistor connected in circuit with said relays to a supply voltage source to energize the relays when the transistor conducts, a timer circuit connected to said normally non-conducting transistor to supply a timed output signal for causing the transistor to conduct for a predetermined short conduction interval, and an operational amplifier coupled to said sensor means and said timer circuit for supplying an amplified signal adequate to cause the timer circuit to produce said timed output signal in predetermined time relation responsive to said changed output signal level of said battery voltage sensor means, said battery voltage level sensor means being a resistance-capacitor circuit formed of a resistor connected to the automobile battery terminal and a capacitor connected in series between said resistor and electrical ground for establishing a voltage level at the connection between the resistor and capacitor corresponding to the battery voltage level when the capacitor charges up to the full battery voltage over a relatively long delay period determined by the values of the resistor and capacitor, said operational amplifier being coupled to said connection between the capacitor and resistor and providing means responsive to a reduction in the voltage level at said connection which persists for a predetermined time period after the battery voltage reduces responsive to energization of the automobile dome light or trunk light to render the operational amplifier non-responsive to short term high voltage spikes and provide said amplified signal responsive to signal level changes typically less than about 200 millivolts.

2. An automobile burglar alarm as defined in claim 1, wherein said operational amplifier includes a feedback circuit from its output to its negative polarity input and has its positive polarity input connected to said sensor means to receive said changed output level, the operational amplifier being capable of producing a negative going output signal of more than ½ volt amplitude responsive to the changed output signal level from the sensor means.

3. An automobile burglar alarm as defined in claim 1, wherein said timer circuit is a 10-second integrated circuit timer for producing a 10-second positive going output signal to be applied to said transistor causing the transistor to conduct for said 10-second interval energizing said relays to energize the automobile headlights and horn for said 10-second period and then terminate relay energization.

4. An automobile burglar alarm as defined in claim 2, wherein said timer circuit is a 10-second integrated circuit timer for producing a 10-second positive going output signal to be applied to said transistor causing the transistor to conduct for said 10-second interval energizing said relays to energize the automobile headlights and horn for said 10-second period and then terminate relay energization.

5. An automobile burglar alarm as defined in claim 1, including a startup time delay circuit coupled to said timer circuit for inhibiting operation of the timer circuit from timing out said predetermined short conduction interval for a predetermined delay period following initial supply of power to the automobile burglar alarm.

6. An automobile burglar alarm as defined in claim 1, including a 15-second startup time delay circuit connected to said timer circuit for inhibiting the timer circuit from supplying said timed output signal for a 15-second period following initial connection of the automobile burglar alarm to a supply voltage source to supply power to the burglar alarm.

7. An automobile burglar alarm as defined in claim 1, including electrical circuit means defining a sound detector channel for sensing sounds having frequencies in a predetermined frequency range associated with automotive breakin and supplying a sound channel signal to said timer circuit to trigger the latter to supply said timed output signal for causing said transistor to conduct and cause energizing of the automobile headlights and horn for said predetermined conduction interval.

8. An automobile burglar alarm as defined in claim 2, including electrical circuit means defining a sound detector channel for sensing sounds having frequencies in a predetermined frequency range associated with automotive breakin and supplying a sound channel signal to said timer circuit to trigger the latter to supply said timed output signal for causing said transistor to conduct and cause energizing of the automobile headlights and horn for said predetermined conduction interval.

9. An automobile burglar alarm as defined in claim 3, including electrical circuit means defining a sound detector channel for sensing sounds having frequencies in a predetermined frequency range associated with automotive breakin and supplying a sound channel signal to said timer circuit to trigger the latter to supply said timed output signal for causing said transistor to conduct and cause energizing of the automobile headlights and horn for said predetermined conduction interval.

10. An automobile burglar alarm as defined in claim 1, including a timed delay trigger circuit interposed between said amplifier and said timer circuit to delay activation of the timer circuit to commence supplying said timed output signal for a predetermined disable delay period providing a time interval during which the operator can activate switches to disable the burglar alarm from energizing the automobile headlights or horn.

11. An automobile burglar alarm as defined in claim 2, including a timed delay trigger circuit interposed between said amplifier and said timer circuit to delay activation of the timer circuit to commence supplying said timed output signal for a predetermined disable delay period providing a time interval during which the operator can activate switches to disable the burglar alarm from energizing the automobile headlights or horn.

12. An automobile burglar alarm as defined in claim 3, including a timed delay trigger circuit interposed between said amplifier means and said timer circuit to delay activation of the timer circuit to commence supplying said timed output signal for a predetermined disable delay period providing a time interval during which the operator can activate switches to disable the burglar alarm from energizing the automobile headlights or horn.

13. An automobile burglar alarm as defined in claim 6, including a timed delay trigger circuit interposed between said amplifier means and said timer circuit to delay activation of the timer circuit to commence supplying said timed output signal for a predetermined disable delay period providing a time interval during which the operator can activate switches to disable the burglar alarm from energizing the automobile headlights or horn.

* * * * *